Jan. 7, 1930.   J. FRITZ   1,742,989
METAL CLIP
Filed May 7, 1929
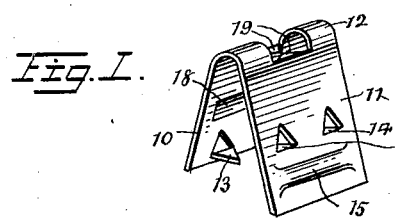
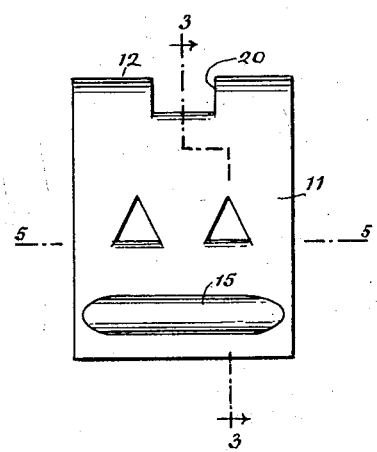
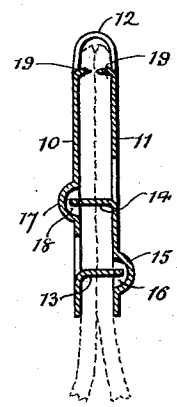
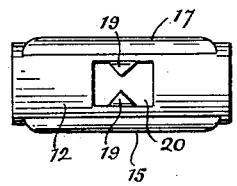
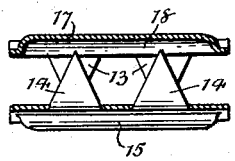
WITNESSES
H. T. Walker
Chris Feinle
INVENTOR
JOHN FRITZ
BY Munn & Co.
ATTORNEYS Patented Jan. 7, 1930

1,742,989

UNITED STATES PATENT OFFICE

JOHN FRITZ, OF NEW BEDFORD, MASSACHUSETTS

METAL CLIP

Application filed May 7, 1929. Serial No. 361,075.

This invention relates to a metal clip which may be used for numerous purposes, and which serves advantageously for closing bags and the like, and also for fastening together sheets of paper, cardboard and the like.

The principal object of the invention is the provision of a metal clip of improved construction, to the end that it will serve most effectively as a reusable fastener for the intended purposes.

The nature of the invention and its distinguishing features and advantages will appear when the following specification is read in connection with the accompanying drawing, in which Figure 1, is a perspective view of a clip constructed according to the invention.

Fig. 2, is a side view.

Fig. 3, is a section taken on the line 3—3 of Fig. 2, showing the clip applied to the mouth end portions of a bag illustrated in dotted lines.

Fig. 4, is an end view.

Fig. 5, is a section taken on the line 5—5, of Fig. 2.

In accordance with the invention a clip is made preferably of a single piece of cold rolled sheet steel, stamped, bent and cut to provide cooperative members 10 and 11 suitably united by a bight 12. The member 10 has teeth 13 which project toward the member 11, and the member 11 has teeth 14 which project toward the member 10. The teeth 14 are somewhat shorter than the teeth 13. The member 11 has a transverse rib 15 presenting a recess 16 adjacent the teeth 13, and the member 10 has a transverse rib 17 presenting a recess 18 adjacent the teeth 14. Small teeth or burrs 19 respectively on the members 10 and 11 are disposed near the bight 12, which in being formed leave a hole 20 in the bight 12.

Attention is now called to the fact that the ribs 15 and 17 add strength and rigidity to the members 10 and 11; that the bight 12 because of the hole 20 therein will be easier to bend in applying and removing the clip; and that the teeth 13 and 14 and recesses 16 and 18 which receive the extremities of said teeth will effectually grip the portions to be fastened together, while the teeth or burrs 19 grip the edges thereof, and thus prevent separation of the clip from said portions.

The clip members 10 and 11 may be pressed toward each other causing the teeth 13, 14 and 19 to penetrate the edge portions of sheets of paper and the like, or mouth end portions of a bag arranged between said members, to securely fasten the sheets together or to close the bag. The clip is reusable and is designed to be readily detached from fastening engagement without tearing the materials.

I claim:

A metal clip consisting of cooperative members united by a bight, each of said members having teeth, the teeth of one member projecting toward the other member, each member having a transverse strengthening rib presenting a recess adjacent the teeth on the other member to receive the latter.

JOHN FRITZ.